United States Patent
Fong et al.

(10) Patent No.: US 8,145,944 B2
(45) Date of Patent: Mar. 27, 2012

(54) BUSINESS PROCESS ERROR HANDLING THROUGH PROCESS INSTANCE BACKUP AND RECOVERY

(75) Inventors: Liana L. Fong, Hawthorne, NY (US); David C. Frank, Hawthorne, NY (US); Linh H. Lam, Hawthorne, NY (US); Zhi L. Zou, Beijing (CN); Yang Z. Zhao, Beijing (CN)

(73) Assignee: International Business Machines Corporation, Armonk, NJ (US)

(*) Notice: Subject to any disclaimer, the term of this patent is extended or adjusted under 35 U.S.C. 154(b) by 230 days.

(21) Appl. No.: 12/570,333

(22) Filed: Sep. 30, 2009

(65) Prior Publication Data

US 2011/0078499 A1 Mar. 31, 2011

(51) Int. Cl.
*G06F 11/00* (2006.01)
(52) U.S. Cl. .......................... 714/15; 714/38.1
(58) Field of Classification Search .................. 714/15, 714/16, 35, 37, 38.1, 38.14; 717/124–127, 717/130–132, 135; 705/7.27
See application file for complete search history.

(56) References Cited

U.S. PATENT DOCUMENTS

| | | | | |
|---|---|---|---|---|
| 5,581,691 A | * | 12/1996 | Hsu et al. ........................ | 714/15 |
| 5,819,022 A | * | 10/1998 | Bandat ............................ | 714/16 |
| 6,594,779 B1 | * | 7/2003 | Chandra et al. ................. | 714/15 |
| 7,103,597 B2 | | 9/2006 | McGoveran | |
| 7,386,751 B2 | | 6/2008 | Cheng et al. | |
| 2006/0005063 A1 | | 1/2006 | Patrick et al. | |
| 2007/0174185 A1 | | 7/2007 | McGoveran | |

* cited by examiner

*Primary Examiner* — Robert Beausoliel, Jr.
*Assistant Examiner* — Joseph Kudirka
(74) *Attorney, Agent, or Firm* — Cantor Colburn LLP; Preston Young (57) ABSTRACT

According to one embodiment of the present invention, a method for business process error handling through process instance backup and recovery includes the step of creating a backup profile of selected one or more portions of a business process model at modeling stage. The method also includes the steps of deploying the backup profile into a runtime environment, and upon occurrence of an error in execution instances of the business process model, re-executing at least one of the one or more portions of the backup profile to recover from the error.

19 Claims, 6 Drawing Sheets

BUSINESS PROCESS ERROR HANDLING THROUGH PROCESS INSTANCE BACKUP AND RECOVERY

BACKGROUND

The present invention relates to business process management, and, more specifically, to business process error handling through business process instance backup and recovery.

Business process management ("BPM") is key to successful business process improvement. For example, BPM can capture business logic as a service such as a common procurement process to be shared among different business parties. During the execution life cycle of a business process, which can be relatively short or long (e.g., hours, days, weeks, months or years), different kinds of errors or failures associated with the business process may occur. Examples include process model bugs (business process level errors), process engine software component failures (process engine level errors), or environmental hardware errors (physical server errors such as physical memory or disk errors).

One aspect of BPM is how it handles these various types of errors or failures. Depending on the implementation of the process workflow engine, the process instance states may have been persisted or stored to a database at various predefined transaction boundaries. Therefore, when a failure or error occurs in the execution of the business process, the instance (i.e., the software thread running according to steps defined in a business process model) can be stepped back to a stored transaction boundary in an attempt to recover from the error. This type of failure recovery management is controlled by the internal logic of the process workflow engine, as the process workflow engine typically includes transaction locking to determine the location of the error or failure. Also, the success of this type of failure recovery management depends on whether any hardware malfunctioning occurs as a part or all of the error or failure.

BRIEF SUMMARY

According to one embodiment of the present invention, a method for business process error handling through process instance backup and recovery includes the step of creating a backup profile of selected one or more portions of a business process model at modeling stage. The method also includes the steps of deploying the backup profile into a runtime environment, and upon occurrence of an error in execution instances of the business process model, re-executing at least one of the one or more portions of the backup profile to recover from the error.

Other embodiments of the present invention include a system and a computer program product that embody the aforementioned method embodiment of the present invention.

According to another embodiment of the present invention, a method for business process error handling through process instance backup and recovery includes the step of creating a backup profile of selected one or more portions of a business process model at modeling stage by creating a backup unit for each one of the one or more portions of an instance of a business process model. The method also includes the steps of deploying the backup profile into a runtime environment, and upon occurrence of an error in execution instances of the business process model, re-executing at least one of the one or more portions of the backup profile to recover from the error.

DETAILED DESCRIPTION

Figure 1:
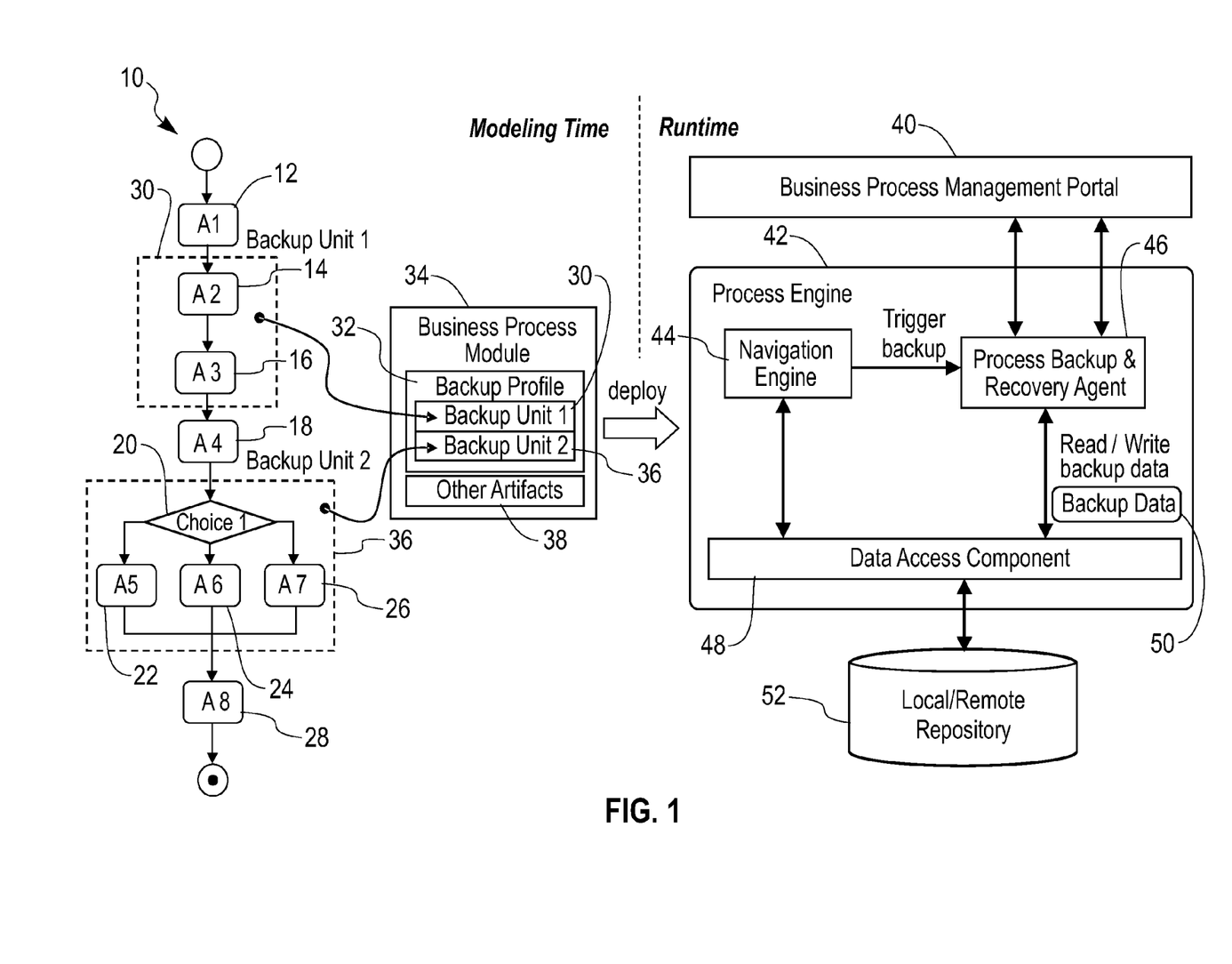
FIG. 1 is a block diagram of an embodiment of the present invention in which a business process model has backup units created during the modeling stage of a business process model and then the recovery process to the appropriate backup unit occurs upon the occurrence of an error during the runtime stage of the business process model.

With reference to FIG. 1, there illustrated is a block diagram of an example of an embodiment of business process error handling through process instance backup and recovery of the present invention. In general, various embodiments of the present invention create backup units for certain portions (e.g., one or more states or activities) of a business process model independent or outside of the control of the internal logic of the process workflow engine. These backup units may be created during a modeling stage of the business process model in which the process model is analyzed to establish its backup profile. The created backup units as part of the backup profile may be stored locally in a persistent store or a repository associated with the processor running the business process model or may be stored in a persistent store or a repository located remote from the processor, for example, in another compatible execution environment. Then, when one of various types of software or hardware errors or failures occurs in the business process model during the execution or runtime of that process model, a recovery occurs where the business process model reverts execution to the appropriate stored backup unit and resumes execution of the business process model initially through execution of the associated backup unit, thereby recovering from the error or failure.

FIG. 1 shows a relatively simple example of a portion of a typical business process model 10. The model 10 includes a number of sequentially executed states or activities 12-28, indicated as steps A1 through A8 in FIG. 1, which activities also include a determination or choice step 20. As part of the embodiment of FIG. 1 and as described and illustrated in more detail hereinafter, during the modeling stage or time the various activities 12-28 illustrated are analyzed to determine their backup profile. Specifically, as part of determining the backup profile of the model 10 the activities 12-28 are determined or "marked" to be "repeatable" or "non-repeatable." In accordance with an embodiment, an activity may be considered to be repeatable if it can be executed one or more times without any undesired consequences. Typically, the definition of the particular business process model determines the criteria for what makes an activity within that model repeatable or non-repeatable. In the exemplary embodiment of FIG. 1, the two activities A2 14 and A3 16 are marked as repeatable based on the predetermined criteria associated with the business process model 10. Also, the choice activity 20, along with activities A5 22, A6 24 and A7 26, are also marked as repeatable according to the appropriate predetermined criteria.

These activities 12-28 are determined to be repeatable or not during the modeling stage or time of the business process model 10, as shown in FIG. 1. The modeling time can occur either during the initial creation of the business process model 10 (i.e., during the time the activities and their sequence of execution within the model are defined) or sometime after the business process model 10 has already been created Due to the fact that the two repeatable activities A2 14 and A3 16 are adjacent one another in FIG. 1, and are preceded by a non-repeatable activity A1 12 and are also followed by a non-repeatable activity A4 18, the repeatable activities A2 14 and A3 16 are located together and labeled as "backup unit 1" 30 within a backup profile 32 that may be part of a business process module 34. In a similar manner, the choice activity 20 and the following activities A5 22, A6 24 and A7 26 are located together and labeled as "backup unit 2" 36 within the backup profile 32. The business process module 34 keeps track of the identified backup units 30, 36 through the backup profile 32 and other related artifacts 38, if applicable. In its simplest form, a backup unit may comprise a single repeatable activity. In the alternative, a backup unit may comprise a relatively large number of repeatable activities.

The first repeatable activity in a backup unit 30, 36 may be referred to as an "anchor" or "checkpoint". Thus, all repeatable activities 12-28 in a process workflow model 10 are potential anchors or checkpoints. In FIG. 1 for backup unit 1 30, activity A2 14 is the checkpoint, while for backup unit 2 36, choice activity 20 is the checkpoint. Various policies (e.g. which backup unit or how far back in the backup profile to be used for the instance's recovery, where the "instance" is the software thread running according to steps defined in the business process model) or additional inputs and information can influence the selection of repeatable activities to be included within or excluded from a backup unit. For example, if an activity is repeatable but it invokes a process that takes a relatively long time to complete, then that activity may be eliminated from the backup unit for performance considerations. Thus, the backup units may be further annotated by users who have knowledge of the business process.

Once the modeling stage is completed, the backup profile 32 of the business process model 10 may then be deployed into a runtime environment. At runtime, a business process management portal 40 is supported underneath by a process engine 42. The navigation engine 44 within the process engine 42 works with additional logic in the form of a process backup and recovery agent 46 to record and retrieve (i.e., "read" and "write") the backup units 30, 36 identified in the modeling stage by the backup profile 32 through a data access component 48. The backup data 50 in the form of instance execution running states specified by the backup units 30, 36 can be stored either locally or remotely in persistent store or repository 52. Thus, because only backup units 30, 36 are being stored in persistent store or a repository 52 as part of the backup profile 32 of the business process module 34, the backup profile 32 has a smaller "footprint" than that of the overall business process model 10. In accordance with various embodiments of the invention, the business management portal 40 and associated components 42, 44, 46, 48 may be implemented in hardware and/or software.

In operation of the embodiment of FIG. 1, after the backup profile 32 is created and stored either locally or remotely in persistent store or a repository 52, during runtime an error or failure may occur with respect to execution of the business process model 10. This error may be considered to be recoverable if the error occurs inside certain activities 12-28 that have been saved as backup units 30, 36 or if the error occurs immediately after a backup unit 30, 36, for example, in activity A4 18 in FIG. 1. For example, if the runtime error occurs with respect to activities A2 14, A3 16, or A4 18, the process instance states can be recovered to a previous normal state before the error by re-executing the activities A2 14 and A3 16 in backup unit 1 30 stored either locally or remotely in persistent store or a repository 52. If the persistent store or a repository 52 is local or remote to or a part of a processor that implements in hardware and/or software the business management portal 40 of FIG. 1, then errors or failures such as the aforementioned process model bugs (business process level errors) or process engine software component failures (process engine level errors) may be recovered by this approach. In addition, primarily hardware errors or failures such as environmental hardware errors (physical server errors such as physical memory or disk errors) may be recovered if the persistent store or a repository 52 is located remote from the processor executing the business management portal 40.

Figure 2:
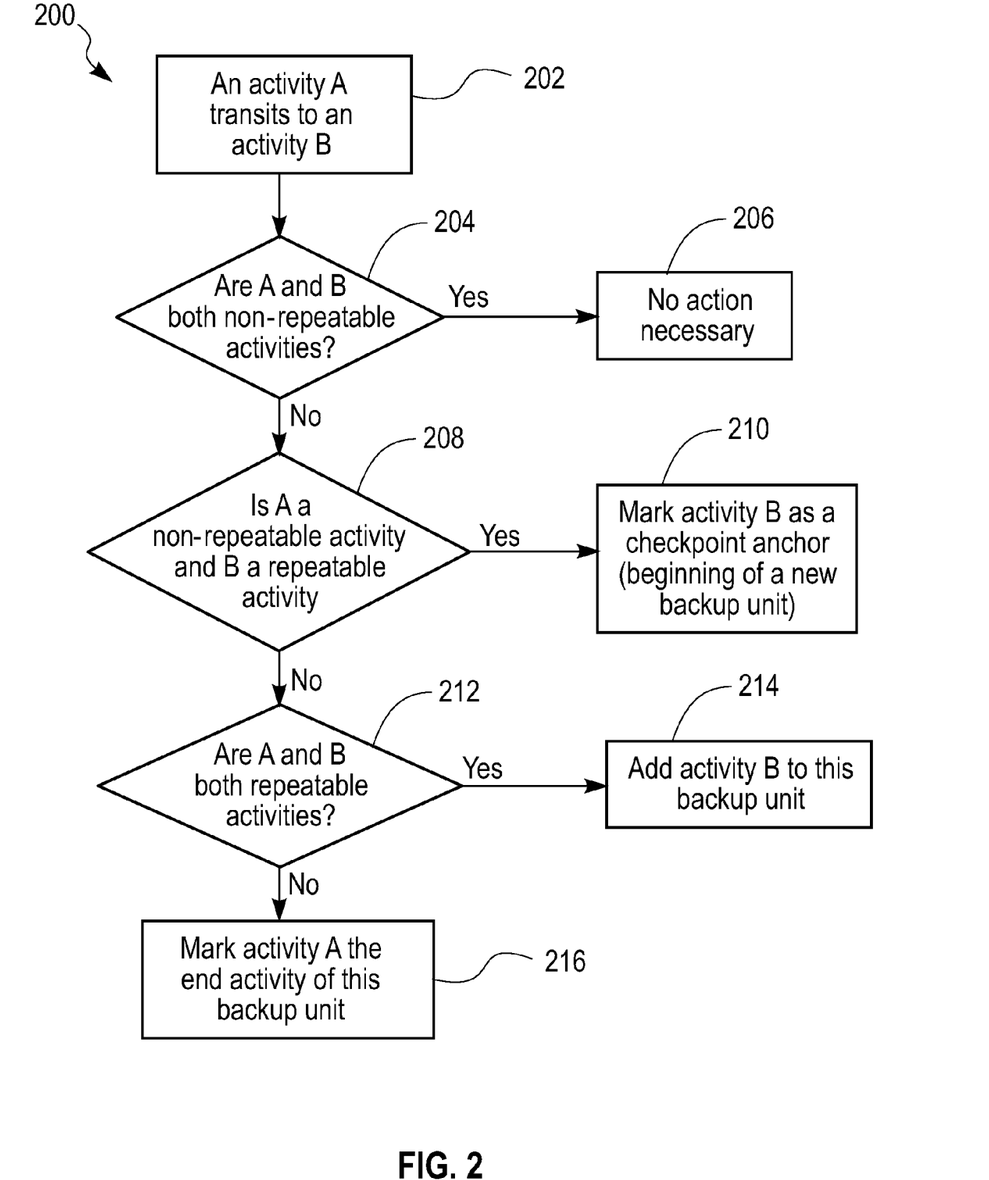
FIG. 2 is a flowchart of a method according to an embodiment of the present invention in which a backup unit is created during the modeling stage of a business process model for various activities in a sequence workflow within the business process model.

Referring to FIG. 2, there illustrated is a flowchart of an exemplary method 200 according to an embodiment of the present invention in which a backup unit 30, 36 (FIG. 1) is created during the modeling stage of a business process model 10 for various activities 12-28 in a sequence workflow within the business process model 10. In a step 202, a first activity A in the sequential flow transits or moves to a second activity B in that flow. In a step 204 both activities A and B are checked to see if they are repeatable or non-repeatable. If both activities A and B are non-repeatable, then no further action is taken and the method 200 ends in a step 206.

Instead, if both activities A and B are not non-repeatable, then a step 208 is executed in which activity A is checked if it is non-repeatable and if B is repeatable. If so, a step 210 is executed in which activity B is marked as a checkpoint or anchor (i.e., the beginning of a new backup unit). If not, then a step 212 is executed in which both activities A and B are checked if they are repeatable. If so, then a step 214 is executed in which activity B is added to this backup unit. If not, then a step 216 is executed in which activity A is marked as the end of this backup unit. The method 200 then ends.

Figure 3:
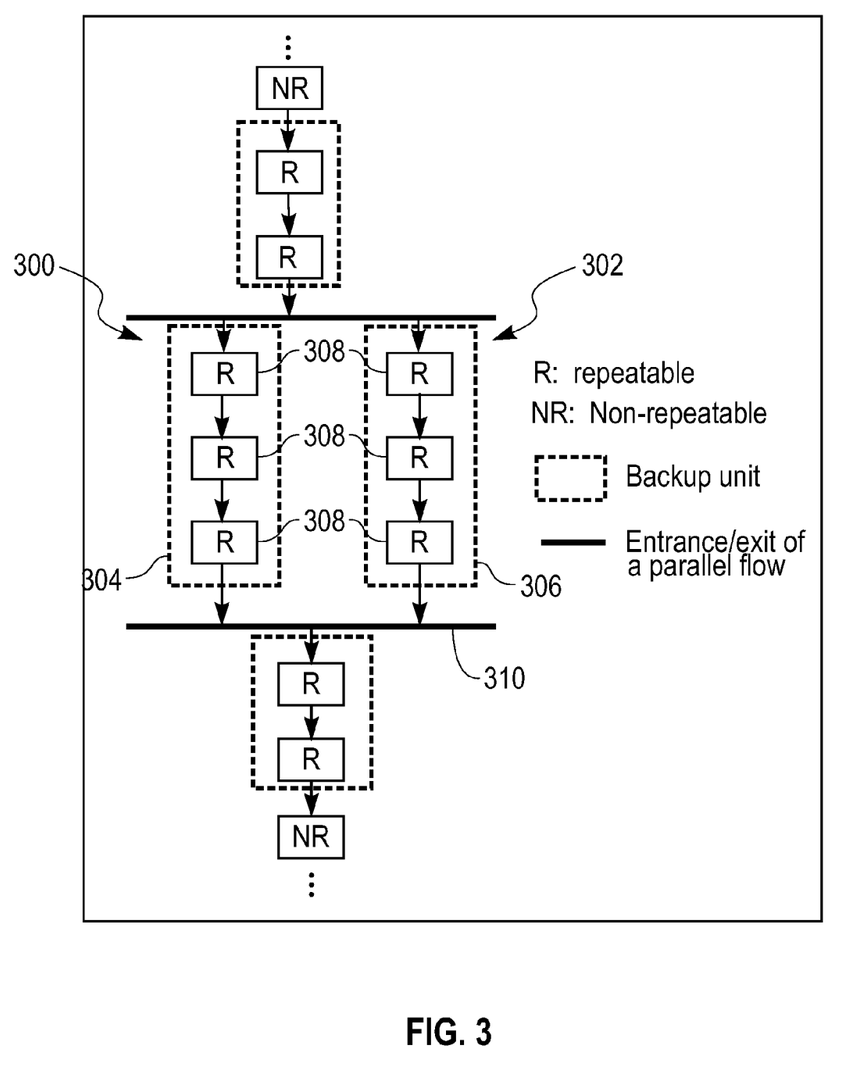
FIG. 3 illustrates a parallel flow path within the business process model in which backup units are established for each path of the parallel flow path according to an embodiment of the present invention.

Referring to FIG. 3, for parallel sequential flow paths 300, 302, the embodiments of the present invention may be applied to each path 300, 302 to establish the backup units 304, 306 in a similar manner as in the method 200 of FIG. 2, where each backup unit 304, 306 comprises a number of repeatable activities 308. Each path 300, 302 of a parallel flow may have its anchor or checkpoint at the entrance of each path as shown in FIG. 3. For certain embodiments in a parallel flow where there is a synchronization link between two activities from two different paths of the parallel flow (i.e. a BPEL Flowlink or exit 310 from parallel flow paths 300, 302), when both of these activities are repeatable (e.g., the bottom activity 308 in each of the parallel flow paths 300, 302), they can be considered as anchors or be included in their respective backup units 304, 306—otherwise, they cannot be considered as such. For exclusive choice structures, since only one path can be chosen at runtime, the backup units can be established based on the activities of each path by applying the same method 200 of FIG. 2 for sequential and parallel flow structures.

Figure 4:
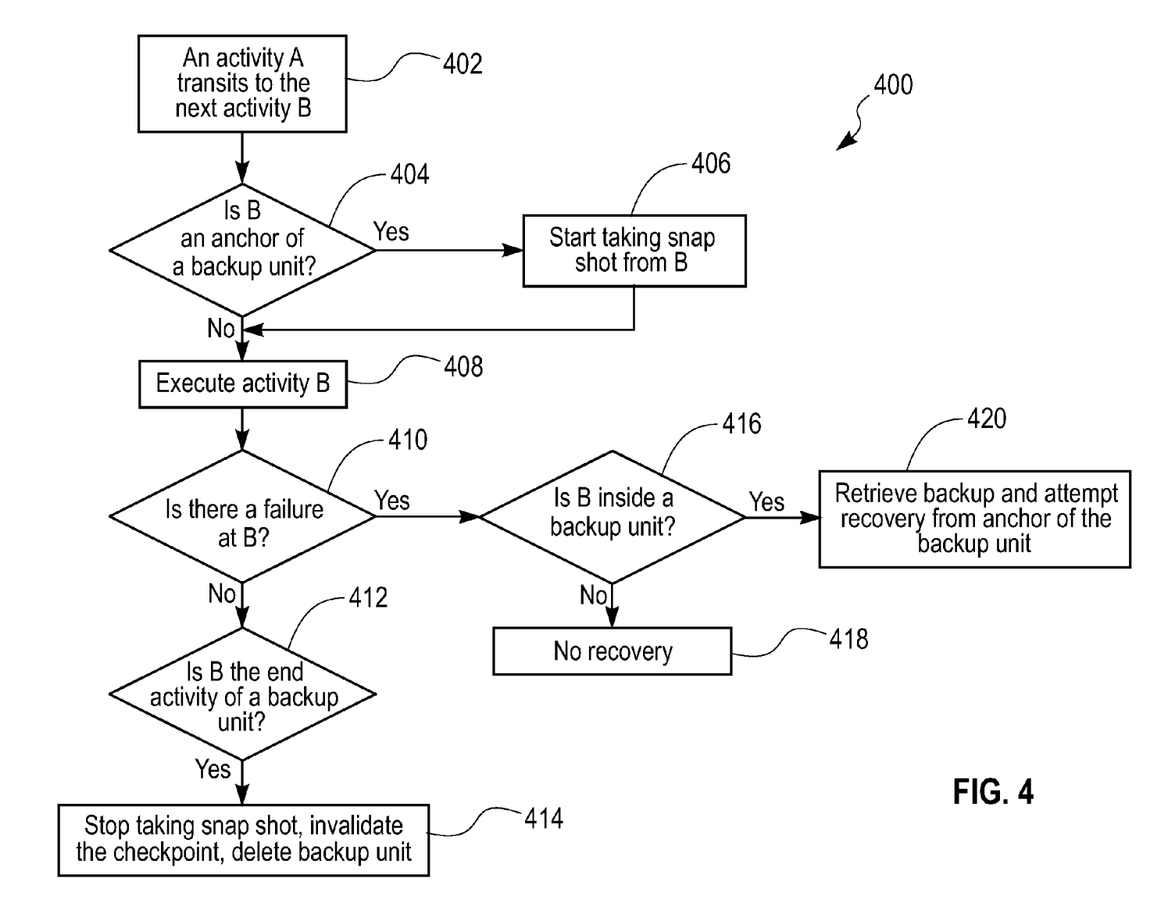
FIG. 4 is a flowchart of a method according to an embodiment of the present invention in which a backup unit is created and retrieved during the runtime stage of a business process model.

Referring to FIG. 4, there illustrated is a flowchart of a method 400 according to an embodiment of the present invention in which a backup unit is created and retrieved during the runtime stage of a business process model 10 (FIG. 1). The method 400 uses two activities A and B in a sequential flow to illustrate how a backup unit is created and how the backup unit data is retrieved for recovery. In a step 402, an activity A transits to activity B. Next, in a step 404, activity B is checked to see if it is an anchor point of a backup unit. If so, a step 406 is executed in which a "snap shot" of the backup unit is taken from activity B. Next, in a step 408 activity B is executed. A step 410 is then executed in which activity B is check to see if a failure or error exists in this activity. If no failure in activity B exists, a step 412 is executed in which activity B is checked to see if it is the end activity of a backup unit. If so, a step 414 is executed in which the snap shot is terminated, the checkpoint is invalidated and the backup unit is deleted from memory 52 (FIG. 1).

Instead, if there is a failure at activity B in the step 410, a step 416 is executed in which activity B is checked to see if it is inside of a backup unit. If not, then no recovery of the business process model 10 (FIG. 1) is performed and the method 400 exits in the step 418. If so, a step 420 is executed in which the backup unit is retrieved from persistent store or a repository 52 (FIG. 1) and a recovery of the business process model 10 (FIG. 1) is attempted from the anchor point of the backup unit.

Figure 5:
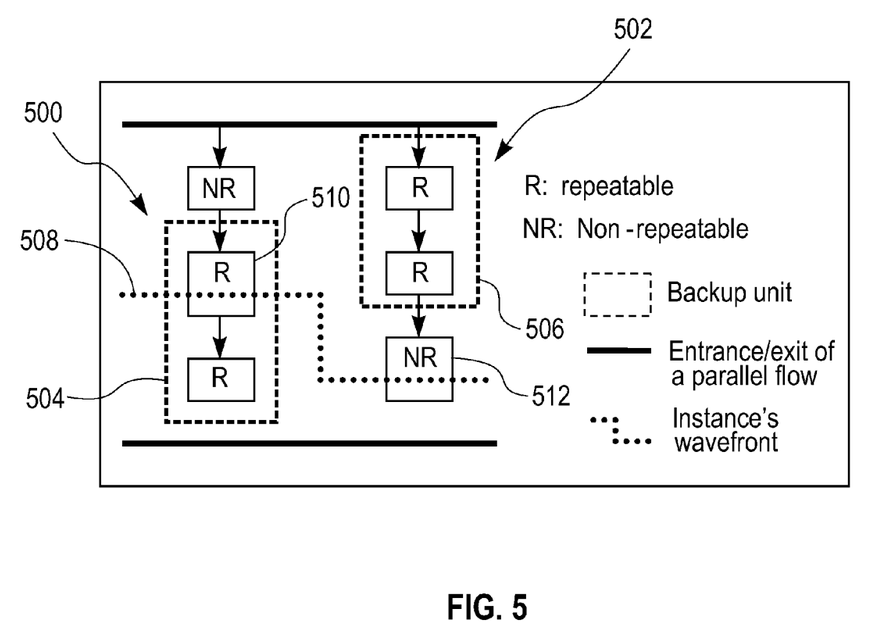
FIG. 5 illustrates a pair of parallel flow paths, each having backup units, within the business process model in which a wavefront of an instance crosses both flow paths.

Referring to FIG. 5, there illustrated is a pair of parallel flow paths 500, 502, each having a backup unit 504, 506 within the business process model 10 (FIG. 1) in which a wavefront 508 of an instance crosses both flow paths 500, 502. When a failure occurs in the business process model 10 (FIG. 1) at runtime, the instance's wavefront 508 is evaluated to see if the wavefront 508 crosses an activity inside a backup unit 504, 506. If the wavefront 508 does cross an activity inside the backup unit 504, 506, then the instance can be re-executed again from the anchor point of the backup unit 504, 506 or from the anchor point of other preceding backup units as long as there is no non-repeatable activity in between these backup units.

In the case of parallel flow paths as illustrated in FIG. 5, the instance wavefront 508 is evaluated as it crosses multiple flow paths 504, 506 to decide whether recovery from the error or failure can be performed. In the example of FIG. 5, even though the wavefront 508 crosses a repeatable activity 510 inside backup unit 504, it also crosses a non-repeatable activity 512 on the other flow path 506. If a failure occurs at this point, the instance states typically cannot be recovered.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
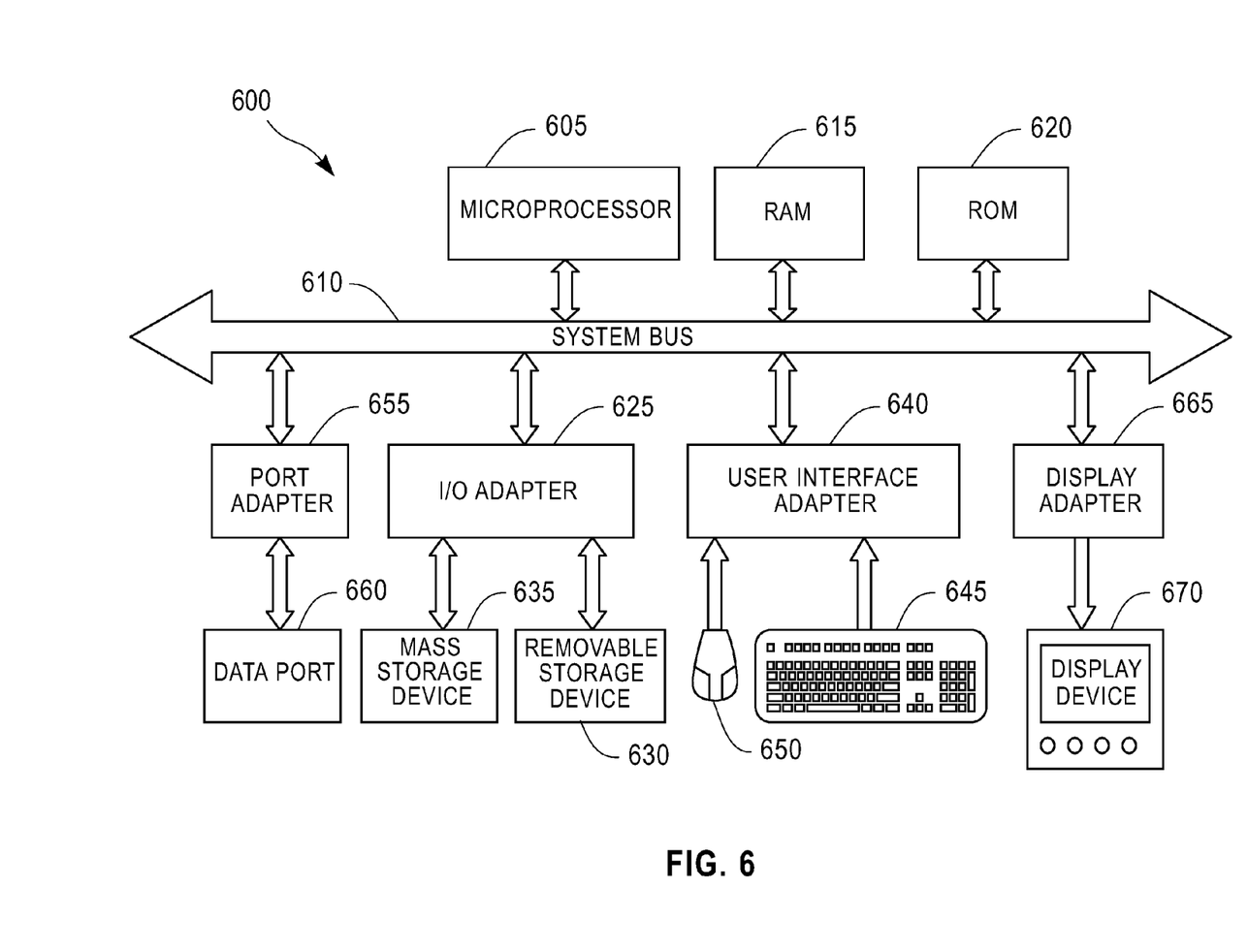
FIG. 6 is a schematic block diagram of a computer suitable for practicing embodiments of the present invention.

Referring now to FIG. 6, computer system 600 has at least one microprocessor or central processing unit (CPU) 605. CPU 605 is interconnected via a system bus 610 to a random access memory (RAM) 615, a read-only memory (ROM) 620, an input/output (I/O) adapter 625 for a connecting a removable data and/or program storage device 630 and a mass data and/or program storage device 635, a user interface adapter 640 for connecting a keyboard 645 and a mouse 650, a port adapter 655 for connecting a data port 660 and a display adapter 665 for connecting a display device 670.

ROM 620 contains the basic operating system for computer system 600. The operating system may alternatively reside in RAM 615 or elsewhere as is known in the art. Examples of removable data and/or program storage device 630 include magnetic media such as floppy drives and tape drives and optical media such as CD ROM drives. Examples of mass data and/or program storage device 635 include hard disk drives and non-volatile memory such as flash memory. In addition to keyboard 645 and mouse 650, other user input devices such as trackballs, writing tablets, pressure pads, microphones, light pens and position-sensing screen displays may be connected to user interface 640. Examples of display devices include cathode-ray tubes (CRT) and liquid crystal displays (LCD).

A computer program with an appropriate application interface may be created by one of skill in the art and stored on the system or a data and/or program storage device to simplify the practicing of embodiments of the invention. In operation, information for, or the computer program created to run, embodiments of the present invention is loaded on the appropriate removable data and/or program storage device 630, fed through data port 660 or typed in using keyboard 645.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for business process error handling through process instance backup and recovery, the method comprising:

creating a backup profile of selected one or more portions of a business process model during initial creation of the business process model, wherein creating the backup profile during the initial creation of the business process model comprises marking activities as repeatable activities and non-repeatable activities;

wherein creating the backup profile of the selected one or more portions of the business process model creates a backup unit for each one of the selected one or more portions of the business process model; and wherein based on two repeatable activities being adjacent to one another and based on the two repeatable activities being preceded by a non-repeatable activity and also followed by a separate non-repeatable activity, the two repeatable activities are located together as a first backup unit and are labeled as the first backup unit within the backup profile;

deploying the backup profile into a runtime environment; and upon occurrence of an error in execution instances of the business process model, re-executing at least one of a selected one or more portions of the backup profile to recover from the error.

2. The method of claim 1, wherein creating the backup profile of the selected one or more portions of the business process model stores the created backup profile on a storage device that is local or remote from a processor running the business process model.

3. The method of claim 1, wherein each backup unit includes one or more activities within the business process model.

4. The method of claim 3, wherein the one or more activities are determined to be the repeatable activities based on predetermined criteria.

5. The method of claim 4, wherein one of the predetermined criteria includes that the one or more activities are executed one or more times without any undesired consequences.

6. A computer program product for business process error handling through process instance backup and recovery, the computer program product comprising:

a non-transitory computer-readable storage medium having computer readable program code embodied therewith, the computer readable program code comprising:

computer readable program code configured to implement a method for business process error handling through process instance backup and recovery, the method including:

creating a backup profile of selected one or more portions of a business process model during initial creation of the business process model, wherein creating the backup profile during the initial creation of the business process model comprises marking activities as repeatable activities and non-repeatable activities;

wherein creating the backup profile of the selected one or more portions of the business process model creates a backup unit for each one of the selected one or more portions of the business process model; and wherein based on two repeatable activities being adjacent to one another and based on the two repeatable activities being preceded by a non-repeatable activity and also followed by a separate non-repeatable activity, the two repeatable activities are located together as a first backup unit and are labeled as the first backup unit within the backup profile;

deploying the backup profile into a runtime environment; and upon occurrence of an error in execution instances of the business process model, re-executing at least one of a selected one or more portions of the backup profile to recover from the error.

7. The computer program product of claim 6, wherein creating the backup profile of the selected one or more portions of the business process model stores the created backup profile on a storage device that is local or remote from a processor running the business process model.

8. The computer program product of claim 7, wherein each backup unit includes one or more activities within the business process model.

9. The computer program product of claim 8, wherein the one or more activities are determined to be the repeatable activities based on predetermined criteria.

10. The computer program product of claim 9, wherein one of the predetermined criteria includes that the one or more activities are executed one or more times without any undesired consequences.

11. A system, comprising:

a hardware processor;

a computing network, including the hardware processor, in communication with one or more computer memory storage devices; and the computing network further configured to implement a method for business process error handling through process instance backup and recovery, the method further including:

creating a backup profile of selected one or more portions of a business process model during initial creation of the business process model, wherein creating the backup profile during the initial creation of the business process model comprises marking activities as repeatable activities and non-repeatable activities;

wherein creating the backup profile of the selected one or more portions of the business process model creates a backup unit for each one of the selected one or more portions of the business process model; and wherein based on two repeatable activities being adjacent to one another and based on the two repeatable activities being preceded by a non-repeatable activity and also followed by a separate non-repeatable activity, the two repeatable activities are located together as a first backup unit and are labeled as the first backup unit within the backup profile;

deploying the backup profile into a runtime environment; and upon occurrence of an error in execution instances of the business process model, re-executing at least one of a selected one or more portions of the backup profile to recover from the error.

12. The system of claim 11, wherein creating the backup profile of the selected one or more portions of the business process model stores the created backup profile on a storage device that is local or remote from a processor running the business process model.

13. The system of claim 11, wherein each backup unit includes one or more activities within the business process model.

14. The system of claim 13, wherein the one or more activities are determined to be the repeatable activities based on predetermined criteria.

15. The system of claim 14, wherein one of the predetermined criteria includes that the one or more activities are executed one or more times without any undesired consequences.

16. A method for business process error handling through process instance backup and recovery, the method comprising:

creating a backup profile of selected one or more portions of an instance of a business process model by creating a backup unit for each one of the selected one or more portions of the business process model during initial creation of the business process model, wherein creating the backup profile during the initial creation of the business process model comprises marking activities as repeatable activities and non-repeatable activities;

wherein based on two repeatable activities being adjacent to one another and based on the two repeatable activities being preceded by a non-repeatable activity and also followed by a separate non-repeatable activity, the two repeatable activities are located together as a first backup unit and are labeled as the first backup unit within the backup profile;

deploying the backup profile into a runtime environment; and upon occurrence of an error in execution instances of the business process model, re-executing at least one of a selected one or more portions of the backup profile to recover from the error.

17. The method of claim 16, wherein each backup unit includes one or more activities within the business process model.

18. The method of claim 17, wherein the one or more activities are determined to be the repeatable activities based on whether the one or more activities are executed one or more times without any undesired consequences.

19. The method of claim 16, wherein creating the backup profile stores the created backup units on a storage device that is local or remote from a processor running the business process model.

* * * * *